United States Patent Office 3,020,160
Patented Feb. 6, 1962

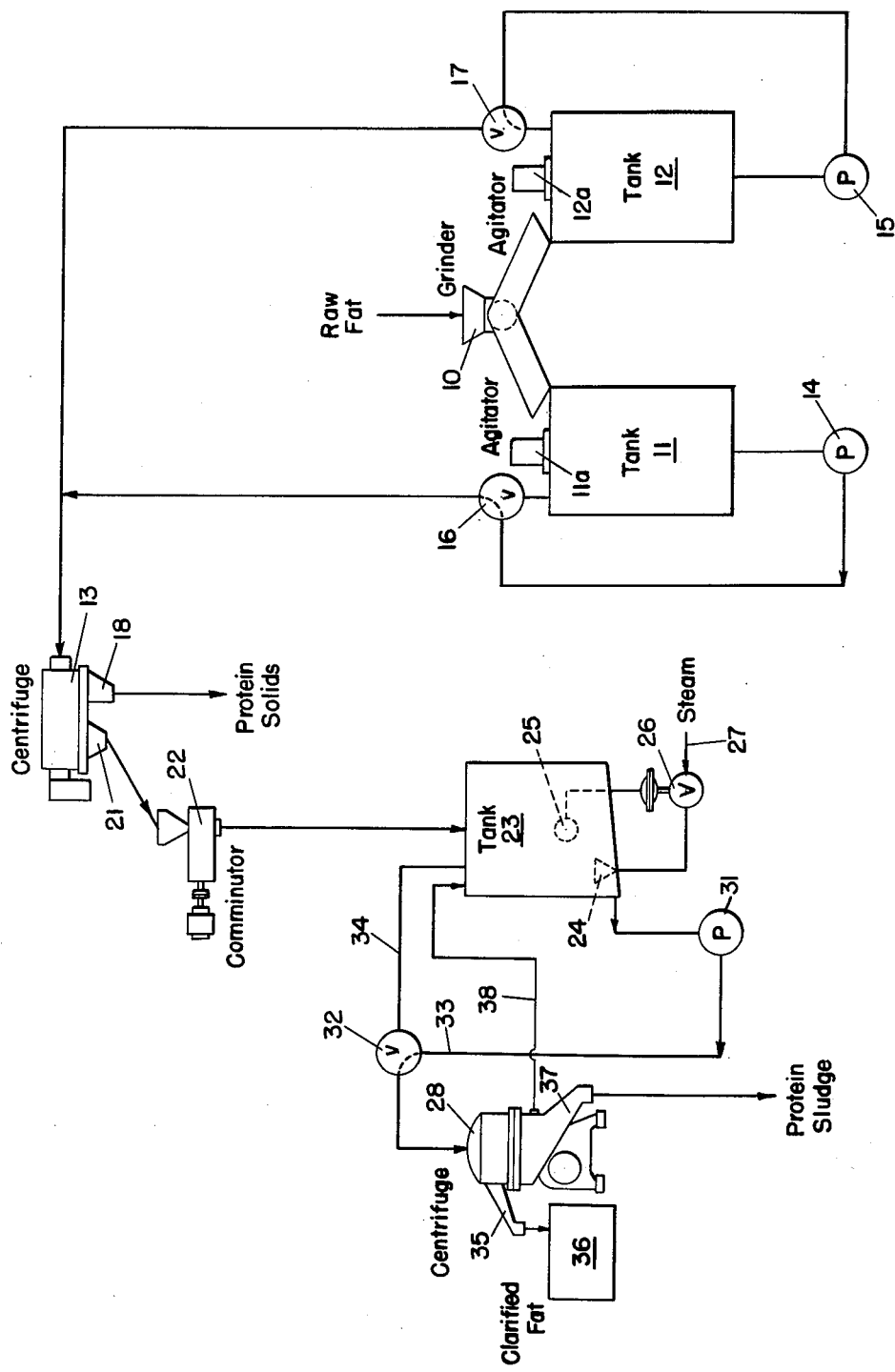

3,020,160
MECHANICAL DEFATTING OF FATTY TISSUE DERIVED FROM ANIMALS
Francis P. Downing and Thomas W. Alberts, Philadelphia, Pa., assignors to The Sharples Corporation, a corporation of Delaware
Filed Aug. 27, 1958, Ser. No. 757,598
3 Claims. (Cl. 99—14)

This invention pertains to the mechanical defatting of fatty tissue derived from animals, such as hogs or cattle, to produce an uncooked meat product, i.e. a meat product in which the protein is not coagulated.

As is well known, the production and marketing of meat products are subject to stringent government regulation and supervision, and products intended for consumption by mankind must meet rather high specifications to obtain approval. Such specifications not only involve the source of the meat products, but equally important, sanitation during production, and the nutritional value of the particular meat product.

One important outlet for such fatty tissue in partially defatted and in uncooked state is in the production of sausage in which protein solids so derived may be substituted for sausage material derived from other sources, provided that such protein solids have the same or a higher nutritional value than the sausage material in prior use.

The determination of the nutritional value of a food is highly complicated, but in the case of protein solids it is based upon an analysis of the protein for the presence, in required quantity, of the ten essential amino acids which are regarded as necessary for body growth. These are lysine, trypotophen, histidiene, phenylalanine, leucine, isoleucine, threonine, methionine, valine and arginine. These essential amino acids are normally present in the protein solids of the fatty tissue which, however, in its normal state, contains far too much fat to be approved as a meat product for human consumption, such as in sausage.

The fat of the fatty tissue is, of course, a valuable product, and great strides have been made in the art in the recovery of the fat, in high quality and high yield, involving the mechanical rupturing of the fatty tissue at relatively low temperatures compared to those employed in the prior conventional wet or dry rendering methods. Although the protein solids thus recovered, particularly when employing the method of U.S. Patent 2,823,215, are of greatly improved value over those obtained when using either the wet or dry rendering method, the present invention is an outstanding improvement from the standpoint of the production of an uncooked meat products meeting government specifications for sale as such, or in other form, such as in sausage.

Sausage conventionally contains up to 45% moisture and up to 45% fat. Both moisture and fat contribute to texture, and the fat acts as a binder. It is difficult, if not impossible from a practicable point of view, to add either component in large percentage to protein to synthesize a sausage mix. Moreover, fat sold as an ingredient in sausage commands a price, under present market conditions, about twice that of separated fat per se. It follows that the direct production of uncooked sausage material with protein, fat and moisture properly proportioned is highly desirable economically, and it is to this purpose that this invention is directed.

In accordance with the present invention the fatty tissue whether chilled, warm or at room temperature, is ground or otherwise comminuted, e.g. to an average particle size between 1/32" and 3/4". The ground mass is thereafter warmed to a temperature sufficiently high to melt the higher melting fats present but not exceeding 120° F., and preferably not exceeding 117° F., and is held under such temperature conditions until thermal equilibrium is reached throughout the ground mass. Melting of the fat is thus carried out without subjecting the protein solids to cooking or partial cooking conditions, i.e. the protein solids remain in wholly uncoagulated condition. As a result the protein solids, for practicable purposes, are recovered essentially in their original natural state. After thermal equilibrium has been reached, the mass is then subjected to centrifugal separation for purposes of separating and recovering the major part of the protein solids, e.g. between 70 and 95%, or higher, such thermal equilibrium, particularly at the low temperatures involved, being essential to the centrifugal separation of protein solids in improved high yield.

The liquid effluent from the centrifugal separation contains fat, emulsion, water and the rest of the solids, the water being that, or in large part that, originally present in the fat. This liquid effluent is thereafter passed through a comminutor wherein the rest of the solids are reduced to a fine state of subdivision, e.g. to a point where the largest dimension of a particle does not exceed 0.035". Thereafter the mass is raised in temperature, either directly, such as with live steam, or indirectly, such as in a heat exchanger, e.g. to between 180 and 210° F., and is subsequently subjected to centrifugal separation to recover the fat in purified state.

Additional features and advantages of the invention will become apparent to persons skilled in the art as the specification proceeds and upon reference to the drawings in which The FIGURE is a flow sheet diagrammatically illustrating the new process.

Referring now more particularly to the flow sheet, at 10 is shown a device for grinding or otherwise comminuting the fat at any desired temperature below protein coagulating temperatures, that is, whether chilled, warm, or at room temperature. Preferably the grinding or other comminuting is such that the average particle size is below 3/4", such as between 1/32" and 3/4". The ground fat is delivered alternately to tanks 11 and 12, each provided with an agitator indicated at 11a and 12a, respectively. Each tank is provided with means for temperature control of the fat and for obtaining thermal equilibrium therein. Any desired means may be employed for the purpose, and indirect temperature control of the fat in the respective tanks 11 and 12 is preferred, such as by the use of a heating coil or a jacket into which steam or hot water may be introduced to bring the fat to, or to hold the fat at, the desired temperature. The respective agitators 11a and 12a assist in obtaining and maintaining substantial thermal equilibrium throughout the fat in the respective tanks 11 and 12.

As indicated above the raw fat ground by grinder 10 flows alternately to tanks 11 and 12. Likewise the contents of tanks 11 and 12 are alternately on stream for further processing, and alternately off stream for filling and holding until thermal equilibrium is reached under the temperature conditions of the invention. Accordingly comminuted raw fat with protein in uncoagulated condition is delivered alternately to tanks 11 and 12 and brought under thermal equilibrium conditions at a temperature sufficiently high to melt the higher melting fats, such as those commonly referred to as stearine, but not exceeding 120° F., in order to retain the protein in uncoagulated condition.

The fat under the temperature conditions indicated flows alternately from tanks 11 and 12 to centrifuge 13, the contents of each tank being alternately on stream, while the other is off stream for thermal equilibrium purposes.

Pumps 14 and 15 are illustrated for purposes of maintaining a substantially constant alternate flow of fat to centrifuge 13 from tanks 11 and 12, three-way valves 16 and 17 being illustrated for returning a part or all of the flow back to its respective tank as desired.

Centrifuge 13 is of the continuous solids-discharge type wherein, in the practice of the invention, the major part of the solids, for example, between 75 and 85% are removed in relatively dry condition from the rest of the mass and discharged as illustrated at 18. A typical centrifuge suited to the purpose is provided with a scroll for plowing the solids to a discharge point, an example of which is the centrifuge disclosed in U.S. Patents 2,679,974 and 2,703,676.

The liquid effluent separated in centrifuge 13, which contains the fat, emulsion, water and the rest of the solids is delivered therefrom at 21 and flows to comminutor 22 wherein the rest of the solids are finely divided to such an extent that the largest dimension of a particle preferably does not exceed 0.035". Comminutors suitable for the purpose are well known, and need not be further described.

The comminuted mass flows from comminutor 22 to tank 23 wherein its temperature is raised either by direct or indirect heating, such as by live steam, to at least 180° F. and preferably not higher than 210° F. Live steam may be introduced into the mass in tank 23 in any desired manner, steam distributor head 24, thermostat 25, valve 26, and steam source 27 being illustrated for the purpose.

The heated mass flows from tank 23 to centrifuge 28, pump 31 being illustrated for purposes of maintaining the flow substantially constant which is preferred. A three-way valve 32 is illustrated in line 33 leading from pump 31 to centrifuge 28, branch line 34 leading back to tank 23, whereby any desired amount of recirculation through tank 23 may be provided for at will.

High quality fat in high yield is delivered from the centrifuge 28 at 35 and is collected in tank 36 from which it may be delivered to any suitable point not shown. The emulsion, the water and the remainder of the solids are delivered from the centrifuge 28 as illustrated at 37.

A suitable centrifuge for performing the opertation of centrifuge 28 is illustrated in FIGURES 2 and 3 of the abovementioned U.S. Patent 2,823,215, such centrifuge operating, for example, in substantially the same manner, for at this point the respective masses to be separated are similar.

This invention represents an improvement over the invention described and claimed in the above-mentioned patent, in that a relatively low temperature is employed in the fat melting step to avoid any significant coagulation of the protein present in the fat, i.e. a temperature sufficiently high to melt the various fats present but not exceeding 120° F., in combination with substantially complete thermal equilibrium throughout the mass of fat prior to the initial centrifuging. The latter not only insures substantially complete fluidity of the fat at the relatively low temperature of operation, but also makes possible the continuous centrifugal separation of the protein solids from the fluidized mass in high yield and in high quality, e.g. in uncoagulated condition and with substantially reduced fat content. Moreover, protein solids are thus produced in which the percentage of protein, fat and moisture are such as to ideally suit such protein solids for direct use in the production of sausage.

The following examples are given by way of illustration and not of limitation.

*Example 1*

2000 lbs. of pork cutting fat without skins were passed in a continuous stream through a grinder having a plate with ⅜" diameter holes. The ground fat was then passed to a steam jacketed tank with an agitator in which the ground fat was brought to thermal equilibrium throughout at a temperature of approximately 117° F. Thereafter the ground and warm fat was pumped to a continuous solids discharge centrifuge of the type disclosed in U.S. Patents 2,679,974 and 2,703,676 wherein protein solids were continuously separated from the fat, emulsion and water, and discharged. A total of 100 lbs. of protein solids having a moisture content of 41% and a fat content of 40% was thus removed from the mixture. These protein solids were in excellent condition, and were highly suitable for sale as such, or in other form, such as in sausage, the original feed being of edible pork fat.

The liquid effluent from the centrifuge was continuously passed through a comminutor known in the trade as a Fitzpatrick comminutor wherein the remaining solids were reduced in size such that their largest dimension did not exceed approximately 0.035". The stream leaving the comminutor was conducted to a tank wherein the mass was treated with live steam to raise its temperature to approximately 195° F. The mixture at this temperature was continuously pumped to a centrifuge of the type described in connection with FIGURES 2 and 3 of Patent 2,823,215 which discharged three streams, namely, clarified fat, valve sludge comprised of solids, water and emulsion, and valve operating fat, each stream being collected separately, the latter stream being returned to said last-mentioned tank. This is illustrated in the flow sheet by line 38. The valve sludge was found to be in excellent condition for batch dry rendering to recover values therefrom. The clarified fat was of high quality and was recovered in high yield.

*Example 2*

4500 lbs. of pork killing fat without skins were passed in a continuous stream through a grinder having a plate with ⅜" diameter holes. The ground fat was then passed to a steam jacketed tank with an agitator in which the ground fat was brought to thermal equilibrium throughout at a temperature of approximately 116° F., the holding time being 15 minutes. Thereafter the ground and warm fat was pumped to a continuous solids discharge centrifuge of the type disclosed in U.S. Patents 2,679,974 and 2,703,676 wherein protein solids were continuously separated from the fat, emulsion and water and discharged. A total of 450 lbs. of protein solids having a moisture content of 45% and a fat content of 38% were thus removed from the mixture. These protein solids were in excellent condition, and were highly suitable for sale as such, or in other form, such as in sausage, the original feed being of edible pork fat.

The liquid effluent from the centrifuge was then processed in the same manner as the liquid effluent from the first centrifuge of Example 1, with similar results.

Any other animal fat may be substituted in the above examples with similar results. This includes beef fat, whale blubber, etc.

It will be understood, of course, that the proportion of protein in fatty tissue varies widely depending upon the part of the animal from which the fatty tissue is derived, and, such as in the case of cutting fats, the amount of meat that is cut away from the fatty tissue before it is fed to the process. In the practice of the process the available protein, in a form highly suitable for direct use in sausage, is recovered in high yield, with both moisture and fat excellently proportioned to protein for the purpose.

Skins, particularly in the case of pork, are preferably rejected as raw material, not only in view of government regulations, but also to avoid the possible chance that bristles or hair will find their way into the product. Skins, however, may be processed if desired, or permitted by government regulations.

It is to be understood that the above particular description is by way of illustration, and that changes, omissions, additions, substitutions and/or other modifications may be made without departing from the spirit of the invention.

We claim:
1. A process for the separation of protein solids in uncoagulated condition from animal fat which comprises reducing said fat to particle sizes not exceeding ¾", thereafter bringing the mass under temperature conditions sufficiently high to melt the fat but not in excess of 120° F. while establishing substantially complete thermal equiribrium throughout said mass, and thereafter and while under the conditions of said thermal equilibrium subjecting said mass to centrifuging to remove protein solids therefrom.

2. A process for the recovery of protein solids in uncoagulated condition from animal fat which comprises subjecting said fat in small particle size not exceeding ¾" to thermal conditions not exceeding 120° F. but sufficient to fluidize the fat present, said thermal conditions being such as to produce substantially complete thermal equilibrium throughout said mass, thereafter and while under the conditions of said thermal equilibrium subjecting said mass in a continuously flowing stream to centrifuging to continuously remove therefrom the major part of protein solids present, subjecting the solids in the rest of the mass to comminution, thereafter heating said last-mentioned mass to raise its temperature to at least 180° F., and subsequently subjecting said last-mentioned mass to centrifuging at a temperature of at least 180° F. to separate the fat from said last-mentioned mass in clarified condition.

3. The process of claim 1 in which the temperature conditions employed to melt the fat do not exceed 117° F.

References Cited in the file of this patent
UNITED STATES PATENTS

| | | |
|---|---|---|
| 2,742,488 | Dufalt | Apr. 17, 1956 |
| 2,745,856 | Dayen et al. | May 15, 1956 |
| 2,823,215 | Downing | Feb. 11, 1958 |